M. INGERSOL.
Field Fence.
No. 66,027.
Patented June 25, 1867.
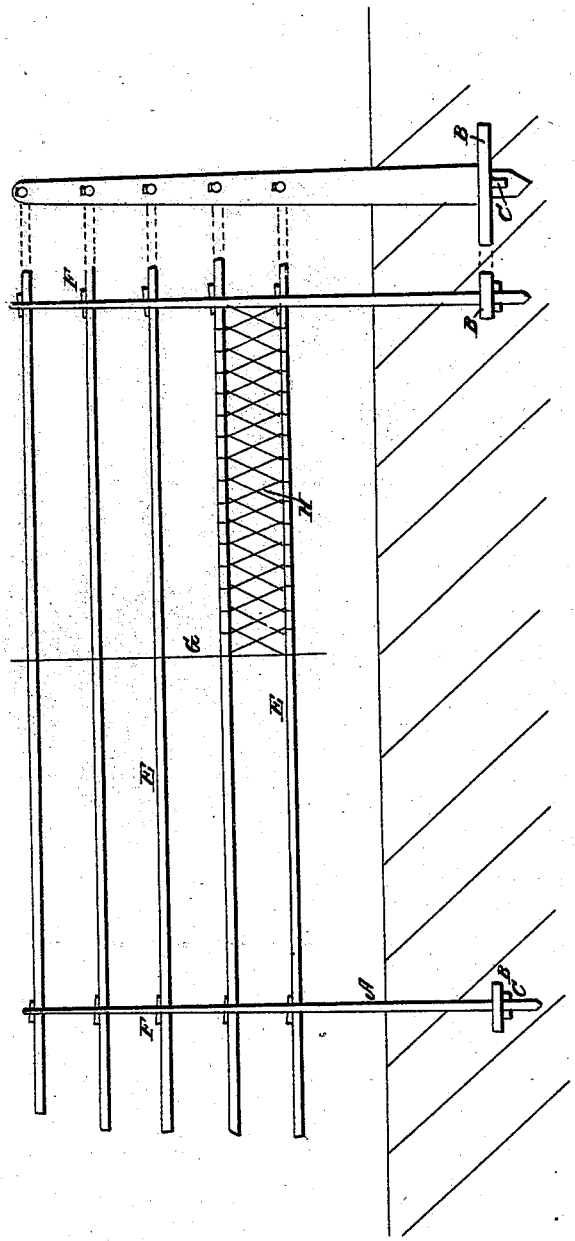
Witnesses:
J. H. Burridge.
Frank Alden
Inventor:
M. Ingersol.

United States Patent Office.

MARSHAL INGERSOLL, OF ELYRIA, OHIO.

Letters Patent No. 66,027, dated June 25, 1867.

IMPROVEMENT IN FIELD FENCE.

*The Schedule referred to in these Letters Patent and making part of the same.*

TO ALL WHOM IT MAY CONCERN:

Be it known that I, MARSHAL INGERSOLL, of Elyria, in the county of Lorain, and State of Ohio, have invented certain new and useful improvements in Field Fences; and I do hereby declare that the following is a full and complete description of the same, reference being had to the accompanying drawing, making a part of this specification.

This fence is constructed of iron, in the manner as shown in the drawing, which represents one section or panel of a line of fence. The posts A of this fence are of cast iron, and the end which is projected into the ground is provided with a foot, B, which may either be cast with the post in one piece, or separately, and the foot then secured to the post with a key, C. These posts are provided with holes D, more or less, as the number of bars or rails E required for the panel, and which are inserted therein and secured to the same by the keys F. The bars are supported in the middle by a tie or brace, G, through which the bars pass, and are thereby prevented from sagging. It will be observed that the foot referred to is arranged transversely to the line of the fence, the purpose of which is to prevent the fence from being blown over, as the broad surface of the foot, when buried in the ground, will keep the posts in an upright position, and thus make the fence more secure and durable. Should this fence be used for field purposes, the net-work H will not be needed; whereas, if used for the garden, it will be required in order to keep out poultry and small animals, &c.

What I claim as my improvement, and desire to secure by Letters Patent, is—

The fence constructed and arranged in the manner and for the purpose substantially as specified.

MARSHAL INGERSOLL.

Witnesses:
W. H. BURRIDGE,
E. E. WAITE.